United States Patent
Lee et al.

(10) Patent No.: US 9,509,515 B2
(45) Date of Patent: Nov. 29, 2016

(54) METHOD AND APPARATUS FOR REGISTERING DEVICES CAPABLE OF DEVICE-TO-DEVICE COMMUNICATION IN SERVER

(71) Applicant: Samsung Electronics Co., Ltd., Suwon-si, Gyeonggi-do (KR)

(72) Inventors: Dongik Lee, Seongnam-si (KR); Daedong Kim, Seongnam-si (KR); Heedong Kim, Namyangju-si (KR); Inho Park, Seoul (KR); Chungyong Eom, Seoul (KR); Yangdon Lee, Seongnam-si (KR); Dongyun Hawng, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 177 days.

(21) Appl. No.: 14/557,921

(22) Filed: Dec. 2, 2014

(65) Prior Publication Data
US 2015/0172061 A1 Jun. 18, 2015

(30) Foreign Application Priority Data
Dec. 17, 2013 (KR) .................. 10-2013-0157442

(51) Int. Cl.
*H04L 9/32* (2006.01)
*H04W 12/06* (2009.01)
*H04W 12/04* (2009.01)
(Continued)

(52) U.S. Cl.
CPC ............ *H04L 9/3247* (2013.01); *H04W 12/04* (2013.01); *H04W 12/06* (2013.01); *H04L 2012/285* (2013.01); *H04L 2012/2841* (2013.01); *H04W 60/00* (2013.01)

(58) Field of Classification Search
CPC ............ H04L 9/3247; H04L 12/2803; H04L 2012/285; H04L 2012/2841; H04L 9/3249; H04L 9/3252; H04L 9/3255; H04L 9/3257; H04W 12/04; H04W 12/06; H04W 60/00; G06F 21/16; G06F 21/64; G06F 2221/0733; G11B 20/00289; G11B 20/00884
USPC ......................................... 713/176
See application file for complete search history.

(56) References Cited

U.S. PATENT DOCUMENTS

| | | |
|---|---|---|
| 2006/0161774 A1 | 7/2006 | Huh et al. |
| 2006/0190538 A1* | 8/2006 | Hwang ............... H04L 12/2809 709/204 |
| 2011/0150266 A1 | 6/2011 | Hohndel |

(Continued)

*Primary Examiner* — William Goodchild
(74) *Attorney, Agent, or Firm* — Jefferson IP Law, LLP (57) ABSTRACT

A method and an apparatus for validating device-to-device (D2D) communication devices in a server via a mobile terminal are provided. A 1st device-to-device (D2D) communication device includes a communication unit for communicating with a mobile terminal via D2D communication, and a controller. The controller is configured to control the communication unit to transmit digital signature information of the 1st D2D communication device to the mobile terminal, receive, when the digital signature information is successfully authenticated in a server, server public encryption information, from the mobile terminal, and transmit device information of the 1st D2D communication device, which is encrypted using the server public encryption information, to the server, and register the 1st D2D communication device in the server. The method and apparatus reduce user input for registering D2D communication devices in a server, increases user convenience, and decrease authentication time.

20 Claims, 6 Drawing Sheets

(51) Int. Cl.
*H04W 60/00* (2009.01)
*H04L 12/28* (2006.01)

(56) References Cited

U.S. PATENT DOCUMENTS

2011/0275316 A1* 11/2011 Suumaki ............ G06K 7/10237
                                                    455/41.1
2012/0203673 A1    8/2012 Morgan et al.
2013/0046695 A1    2/2013 Acosta-Cazaubon et al.
2013/0145163 A1*  6/2013 Iwamura ............. H04L 12/2809
                                                    713/168
2013/0173811 A1    7/2013 Ha et al.
2013/0315393 A1* 11/2013 Wang .................... H04W 12/04
                                                    380/270
2014/0012750 A1*  1/2014 Kuhn .................... G06Q 20/36
                                                    705/41

* cited by examiner

METHOD AND APPARATUS FOR REGISTERING DEVICES CAPABLE OF DEVICE-TO-DEVICE COMMUNICATION IN SERVER

CROSS-REFERENCE TO RELATED APPLICATION(S)

This application claims the benefit under 35 U.S.C. §119(a) of a Korean patent application filed on Dec. 17, 2013 in the Korean Intellectual Property Office and assigned Serial number 10-2013-0157442, the entire disclosure of which is hereby incorporated by reference.

TECHNICAL FIELD

The present disclosure relates to a method and apparatus for registering devices capable of device-to-device communication (hereinafter, D2D communication devices) in a server. More particularly, the present disclosure relates to a method and apparatus for validating D2D communication devices in a server via a mobile terminal.

BACKGROUND

Devices, such as home appliances, etc., need registration and validation from a server to receive services from the server. Device users can input validation information (e.g., a PIN code, etc.) for validation from a server. Validation information can be transmitted from devices to a server or via additional equipment. When the validation information is transmitted from a device to a server via additional equipment, the device would need to be paired with that additional equipment.

However, the pairing process may fail due to user faults, interference with equipment, etc. Accordingly, devices that users didn't consider for connection may engage in pairing between the user's devices. In addition, users can also directly input the device information and the digital signature information into the devices in order to transmit it to a server; however, this causes the user inconvenience.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for registering devices capable of device-to-device communication (D2D communication devices) in a server, and validating the devices via a mobile terminal.

In accordance with an aspect of the present disclosure, a method for registering a 1st device-to-device (D2D) communication device in a server is provided. The method includes transmitting, by the 1st D2D communication device, digital signature information of the 1st D2D communication device to a mobile terminal via D2D communication, receiving, by the 1st D2D communication device, when the digital signature information is successfully authenticated in the server, server public encryption information, from the mobile terminal via D2D communication, and transmitting, by the 1st D2D communication device, device information of the 1st D2D communication device, which is encrypted using the server public encryption information, to the server, and registering the 1st D2D communication device in the server.

In accordance with another aspect of the present disclosure, a 1st D2D communication device is provided. The device includes a communication unit for communicating with a mobile terminal via D2D communication, and a controller. The controller is configured to control the communication unit to transmit digital signature information of the 1st D2D communication device to the mobile terminal, receive, when the digital signature information is successfully authenticated in a server, server public encryption information, from the mobile terminal, and transmit device information of the 1st D2D communication device, which is encrypted using the server public encryption information, to the server, and register the 1st D2D communication device in the server.

In accordance with another aspect of the present disclosure, a method for registering a 1st device capable of device-to-device (D2D) communication in a server via mobile terminal is provided, The method includes receiving, by the mobile terminal, digital signature information of the 1st D2D communication device from the 1st D2D communication device via D2D communication, transmitting, by the mobile terminal, the digital signature information to the server, receiving, by the mobile terminal, when the digital signature information is successfully authenticated in the server, server public encryption information from the server, and transmitting, by the mobile terminal, the server public encryption information to the 1st D2D communication device via D2D communication.

In accordance with another aspect of the present disclosure, a mobile terminal is provided. The mobile terminal includes a communication unit configured to communicate with a 1st device or a server, and a controller. The controller is configured to control the communication unit to receive digital signature information of the 1st device via D2D communication, transmit the digital signature information to the server, receive, when the digital signature information is successfully authenticated in the server, server public encryption information from the server, and transmit the server public encryption information to the 1st device via D2D communication.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

'Mobile terminals' refer to electronic devices that can communicate with base stations, devices, and additional equipment via device-to-device (D2D) communication. It should be understood that the described examples can be applied to all information communication devices, multimedia devices, and their applications, for example, IP multimedia subsystem (IMS), terminals, personal computers (PCs), tablet PCs, Portable Multimedia Players (PMPs), Personal Digital Assistants (PDAs), smart phones, mobile phones, digital albums, etc.

D2D communication refers to direct communication between electronic devices and includes, for example, 'Wi-Fi Direct,' 'Bluetooth,' Radio Frequency Identification (RFID), 'Infrared Data Association (IrDA),' Near Field Communication (NFC), 'ZigBee,' etc.

For example, 'Wi-Fi Direct' implements Peer-To-Peer (P2P) transmission by direct communication between electronic devices without requiring an Internet access or a wireless Access Point (AP). 'Wi-Fi Direct' is a standard that defines wireless P2P communication and enhances the communication performance. 'Wi-Fi Direct' is called Wi-Fi P2P. 'Wi-Fi Direct' has a type of infrastructure, not ad hoc, and supports direct communication between terminals, so that the security is enhanced, as compared to an ad hoc network. 'Wi-Fi Direct' can also provide Internet service support with more ease.

Preferred embodiments according to the disclosure will be described in detail with reference to the accompanying drawings. It will be easily appreciated to those skilled in the art that various modifications, additions and substitutions are possible from the embodiment of the disclosure, and the scope of the disclosure should not be limited to the following various embodiments. The embodiment of the disclosure is provided such that those skilled in the art completely understand the disclosure. Therefore, the shapes of elements in the drawings are exaggerated to focus on the disclosure. In the drawings, the same or similar elements are denoted by the same reference numerals even though they are depicted in different drawings.

Figure 1:
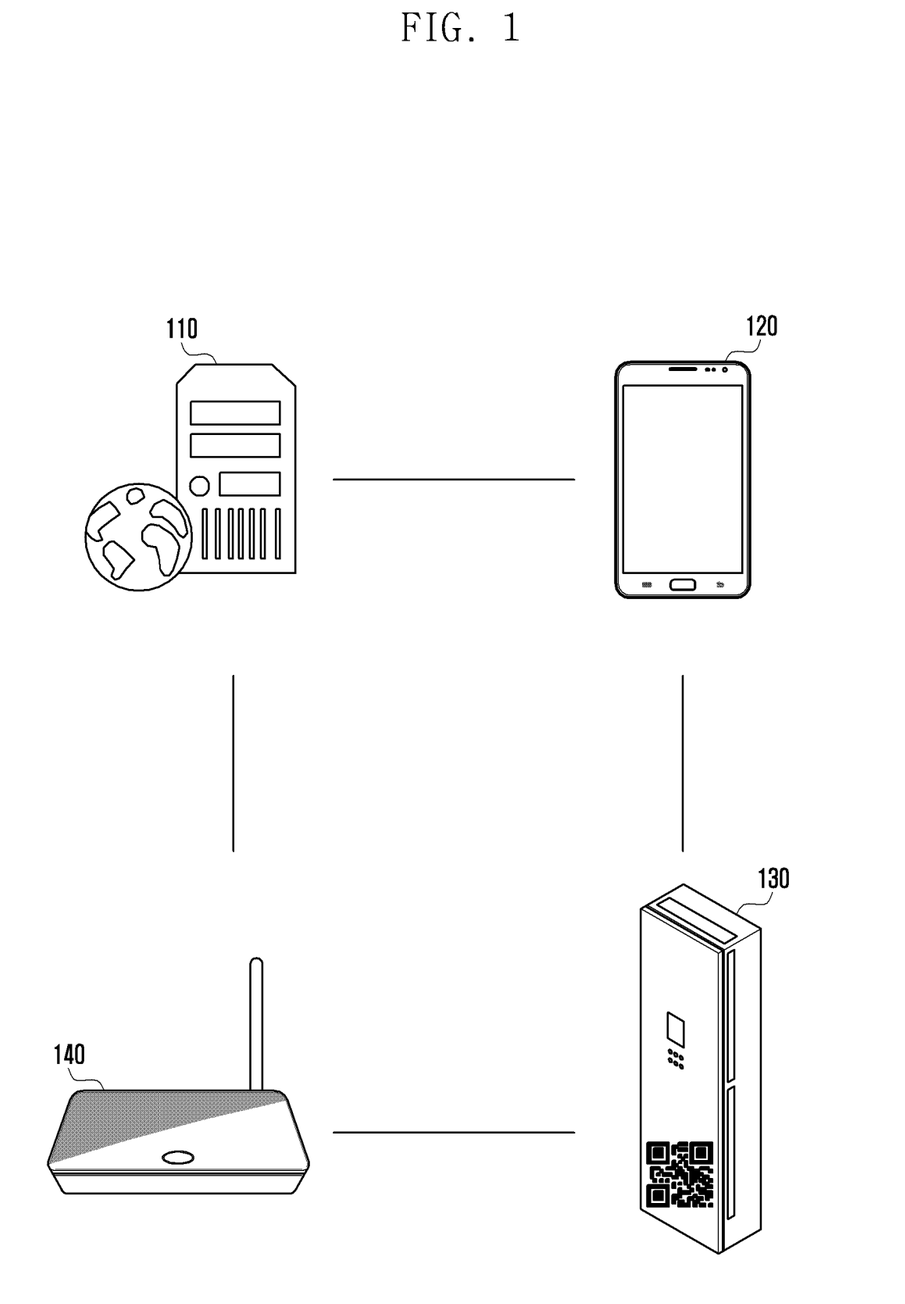
FIG. 1 illustrates a system for registering a 1st device capable of device-to-device communication (1st D2D communication device) in a server according to an embodiment of the present disclosure.

FIG. 1 illustrates a system for registering a 1st device capable of device-to-device communication (1st D2D communication device) in a server according to an embodiment of the present disclosure.

Referring to FIG. 1, the system includes a server 110, a mobile terminal 120, a 1st device 130, and a 2nd device 140.

The server 110 authenticates devices, registers the devices if validated, and provides services to the authenticated devices. The server 110 also checks the states of home appliances, controls the home appliances, and provides corresponding services to the home appliances. The mobile terminal 120 communicates with additional equipment or the server 110. The 1st device 130 supports a D2D communication function. The 1st device 130 may include fixed or portable devices, e.g., televisions, refrigerators, air-conditioners, electric fans, headphones, vacuum cleaners, washing machines, humidifiers, gas stoves, water purifiers, electric ovens, etc. It should be understood that the 1st device 130 is not limited to home appliances. That is, the 1st device 130 may include all types of devices that can support a D2D communication function and make D2D communication with the server 110. The 1st device 130 can be connected to the 2nd device 140 or the mobile terminal 120 via D2D communication. The 1st device 130 may include a tag (e.g., a Quick Response (QR) code, an NFC tag, a RFID tag or a barcode). The tag of the 1st device 130 may be attached to or built in the 1st device 130, and may be in the form of a pattern. The tag of the 1st device 130 may be implemented to be separate from the 1st device 130, e.g., disposed on a wall near the 1st device 130, on the user manual of the 1st device 130, on other devices, or the like. In an embodiment of the present disclosure, the 1st device 130 may activate or deactivate a D2D communication function according to a user's input. For example, the 1st device 130 may activate or deactivate a Wi-Fi Direct function when the user presses a particular button. The 2nd device 140 is connected to the server 110 via a wired or wireless connection, and serves as an AP.

Figure 2:
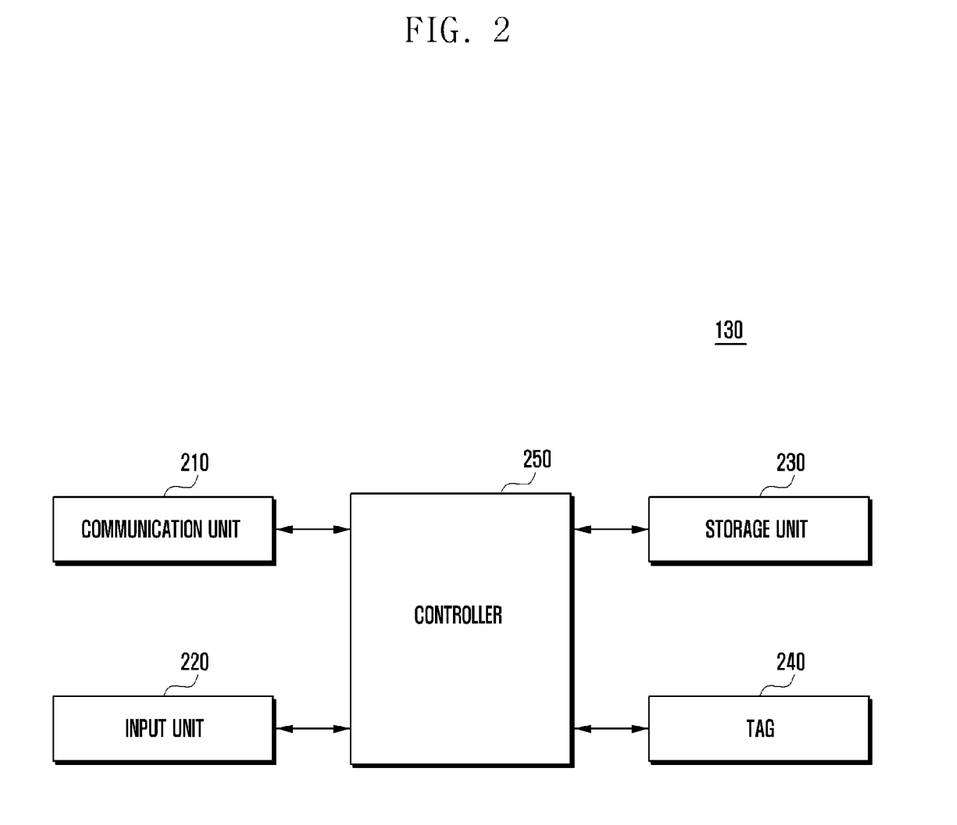
FIG. 2 illustrates a block diagram of a 1st D2D communication device according to an embodiment of the present disclosure.

FIG. 2 illustrates a block diagram of a 1st D2D communication device according to an embodiment of the present disclosure.

Referring to FIG. 2, the 1st device 130 includes a communication unit 210, an input unit 220, a storage unit 230, a tag 240, and a controller 250.

The communication unit 210 performs D2D communication with other devices. In an embodiment of the present disclosure, D2D communication may include Wi-Fi Direct. Thus, the 1st device 130 can be connected to the mobile terminal 120 via a Wi-Fi Direct link. In an embodiment of the present disclosure, the 1st device 130 may be placed in a station mode and can be connected to the 2nd device 140. That is, the 1st device may serve as an AP via Wi-Fi.

The input unit 220 receives a user's input. That is, the 1st device 130 detects a user's input via the input unit 220. The input unit 220 may be implemented with input devices for performing functions of the 1st device 130. For example, the input unit 220 includes a registration button for activating Wi-Fi Direct and initiating server authentication procedure. The registration button may be implemented with a soft key, a hard key, etc.

The storage unit 230 includes volatile and non-volatile storage devices such as cache memory, Dynamic Random Access Memory (DRAM), Static Random Access Memory (SRAM), flash memory, magnetic disk storage, optical disc storage, etc. The storage unit 230 stores information of the 1st device 130, digital signature information of the 1st device 130, server public encryption information, private encryption information of the 1st device 130, public encryption information of the 1st device 130, etc.

The tag 240 is an information system for the 1st device 130 and may be attached to the 1st device 130. The tag 240 may include a QR code, an NFC tag, a RFID tag, a barcode, etc. The tag 240 includes information that the mobile terminal 120 needs to connect to the 1st device 130 via D2D communication (e.g., a Media Access Control (MAC) address of the 1st device 130, a Service Set Identifier (SSID), a Password, and a Secure Option, etc.), which is required for Wi-Fi Direct connection to the 1st device 130. The tag 240 may also include at least one of the following: a Universal Resource Information (URI) of a server, public encryption information of the 1st device 130, a Certificate Authority (CA) signature, and device information of the 1st device 130. The public encryption information of the 1st device 130 may include a public key of the 1st device 130.

The controller 250 transmits digital signature information of the 1st device 130 to the mobile terminal 120. When authentication of the digital signature information is successful in the server 110, server public encryption information is transmitted to the mobile terminal 120. Using the received server public encryption information, the controller 250 encrypts device information of the 1st device 130 and controls the communication unit 210 to transmit the encrypted device information of the 1st device 130 to the server, thereby registering the 1st device in the server 110. When the controller 250 detects a user's input via the input unit 220, the controller 250 controls the communication unit 210 to activate D2D communication.

Figure 3:
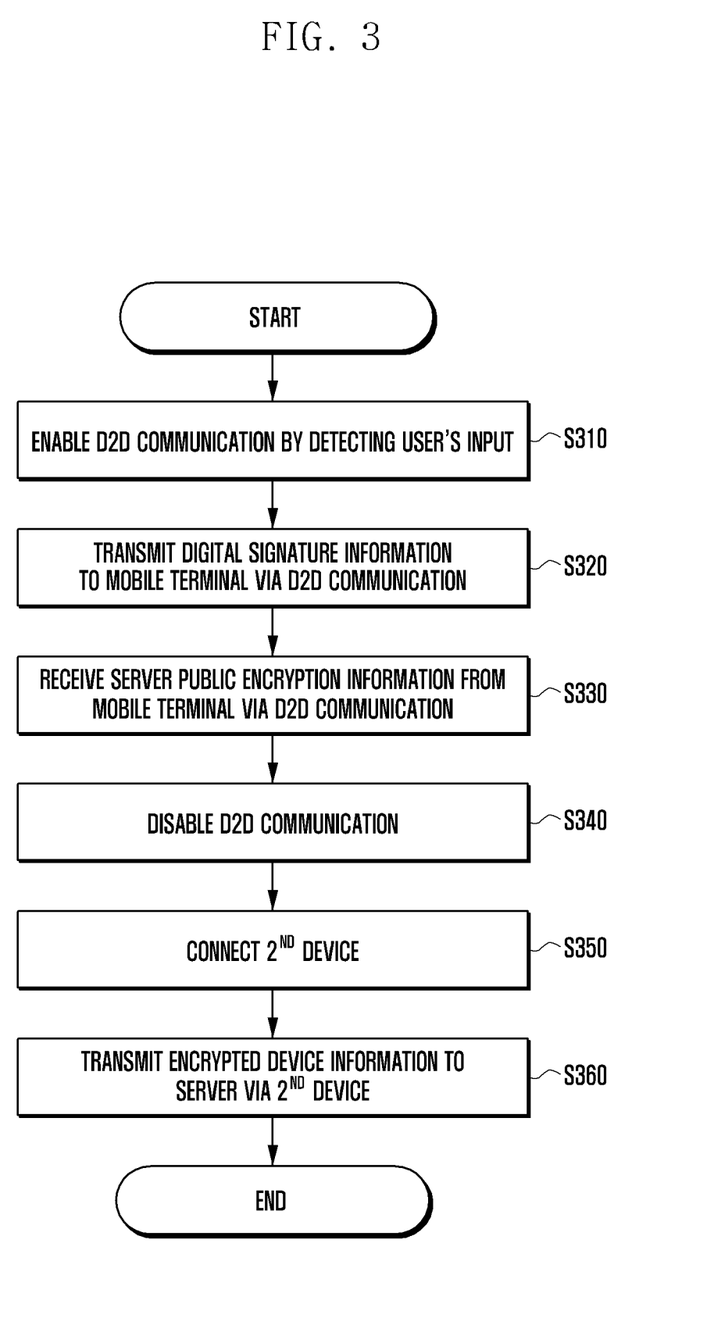
FIG. 3 illustrates a flow chart of a method for registering a 1st D2D communication device in a server according to an embodiment of the present disclosure.

FIG. 3 illustrates a flow chart of a method for registering a 1st D2D communication device in a server according to an embodiment of the present disclosure.

Referring to FIG. 3, when the 1st device detects a user's input, the controller controls the communication unit to activate D2D communication at operation S310. For example, when a user presses a server registration button on the 1st device, the 1st device initiates Wi-Fi Direct communication (i.e., an AP mode). The mobile terminal acquires validation information, which is required to be connected to the 1st device via D2D communication, from the tag of the 1st device. The validation information may be device information of the 1st device. The tag of the 1st device may include at least one of a QR code, an NFC tag, a RFID tag and a barcode.

The mobile terminal is connected to the 1st device via D2D communication by using the information from the tag. For example, the mobile terminal is connected to the 1st device by using MAC address of the 1st device, a SSID, a password, and a Secure Option, which may be required for Wi-Fi Direct connection to the 1st device. The 1st device transmits the digital signature information to the mobile terminal via D2D communication at operation S320. The mobile terminal transmits the device information and digital signature information of the 1st device to the server. The server authenticates the digital signature information of the 1st device and transmits the validation result to the mobile terminal. When the server successfully authenticates the digital signature information of the 1st device, the server transmits the server public encryption information to the mobile terminal. The mobile terminal then transmits the server public encryption information to the 1st device via D2D communication.

After receiving the server public encryption information from the mobile terminal via D2D communication at operation S330, the 1st device may perform a registration procedure to the server with the transmission of the encrypted device information to the server as follows. The 1st device disables D2D communication at operation S340 and then connects to the 2nd device via Wi-Fi at operation S350. That is, disabling D2D communication terminates the Wi-Fi Direct communication and places the 1st device in a station mode. When the 2nd device is connected to the server, the 1st device transmits the encrypted device information of the 1st device to the server via the 2nd device at operation S360.

Figure 4:
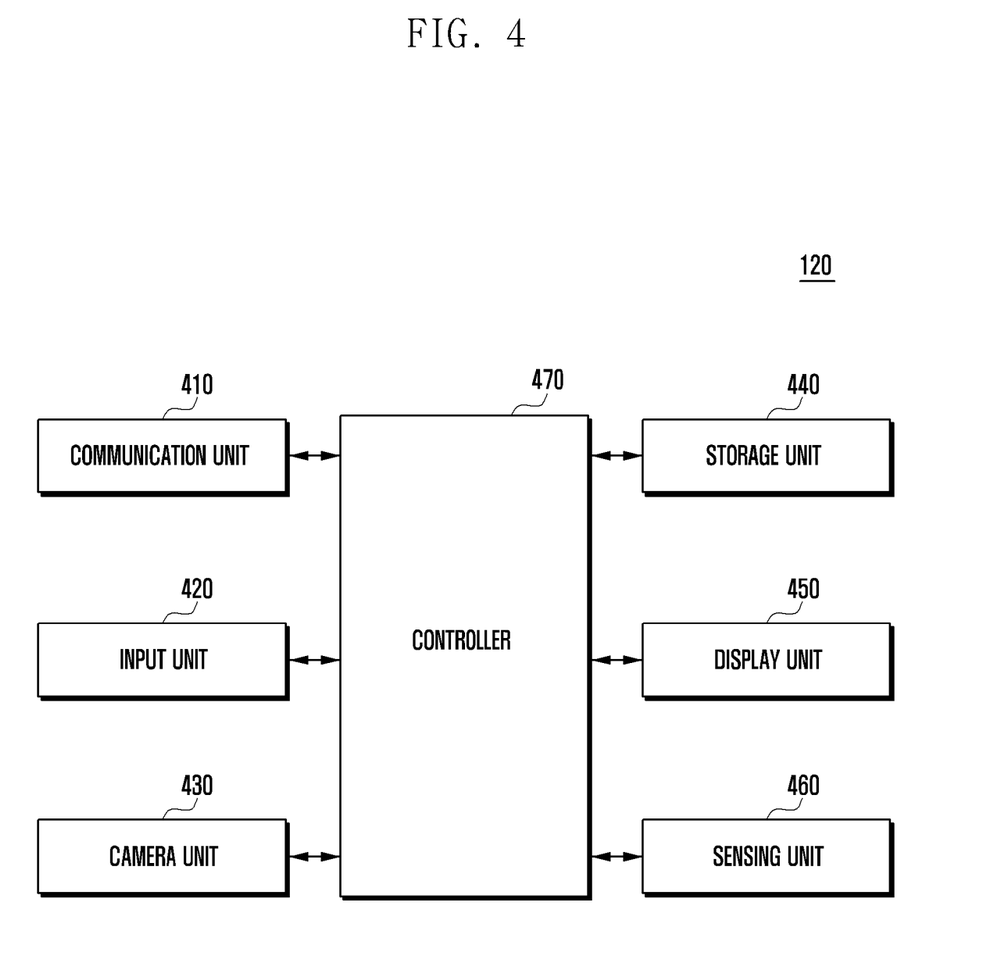
FIG. 4 illustrates a block diagram of a mobile terminal according to an embodiment of the present disclosure.

FIG. 4 illustrates a block diagram of a mobile terminal according to an embodiment of the present disclosure.

Referring to FIG. 4, the mobile terminal 120 includes a communication unit 410, an input unit 420, a camera unit 430, a storage unit 440, a display unit 450, a sensing unit 460, and a controller 470.

The communication unit 410 establishes communication channels for a voice call, a video call, data transmission/reception such as videos, text messages, etc., under the control of the controller 470. The communication unit 410 communications with the 1st device or the server via wired or wireless connections.

The input unit 420 includes a number of keys and function keys for receiving number or characters and performing functions to the mobile terminal 120, according to the user's inputs/operations. The input unit 420 is an input system for receiving a user's inputs. The input unit 420 may be implemented with a touch panel, a microphone, buttons, mouse devices, a remote controller, a jog wheel, a jog switch, etc. The input unit 420 detects inputs for executing applications for recognizing, reading or capturing the tag 240 of the 1st device 130.

The camera unit 430 processes video frames captured by an image sensor in photographing mode or video call mode, etc., e.g., still images or moving images, etc. The processed video frames may be displayed on the display unit 450.

The mobile terminal 120 can acquire the information of the 1st device from the tag 240 via the communication unit 410 or the camera unit 430. The tag of the 1st device includes a QR code, an NFC tag, a RFID tag, and a barcode.

The storage unit 440 includes volatile and non-volatile memory devices such as cache memory, DRAM, SRAM, flash memory, magnetic disk storage, optical disc storage, etc. The storage unit 440 stores information from the tag 240, digital signature information of the 1st device transmitted, a validation result of the 1st device that is received from the server, or server public encryption information. For example, the storage unit 440 stores a video frame of a QR code captured by the camera unit 430 or the analysis result of the QR code from the video frame by the controller 470.

The display unit 450 may be implemented with a Liquid Crystal Display (LCD), Light Emitting Diodes (LEDs), Organic Light Emitting Diodes (OLEDs), or the like. The display unit 450 displays images for user interface, pointer images, objects, etc. The display unit 450 displays applications for recognizing, reading or capturing the tag 240 of the 1st device 130.

The sensing unit 460 may include a various types of sensors for sending user's environment. Examples of the sensing unit 460 are a geomagnetic sensor, a temperature sensor, a pressure sensor, a proximity sensor, a luminance sensor, a Global Positioning System (GPS) sensor, an acceleration sensor, an angular velocity sensor, a speed sensor, a gravity sensor, a tilt sensor, a gyro sensor, etc.

The controller 470 may include a microprocessor or microcomputer such as a central processing unit (CPU), a digital signal processor (DSP), etc. The controller 470 controls the communication unit 410 to receive the digital signature information of the 1st device 130 via D2D communication and transmit the digital signature information to the server 110. The controller 470 controls the communication unit 410 to receive the server public encryption information from the server 110, which the server 110 creates when the digital signature information of the 1st device is successfully authenticated by the server 110. After receiving the server public encryption information, the controller transmits the server public encryption information to the 1st device 130 via D2D communication. In an embodiment of the present disclosure, when transmitting the server public encryption information to the 1st device 130, the controller 470 may also transmit information required to be connected with the 2nd device 140 to the 1st device 130. The controller 470 analyzes a video frame of a QR code captured by the camera unit 430, acquires the information included in the QR code, and stores it in the storage unit 440.

Figure 5:
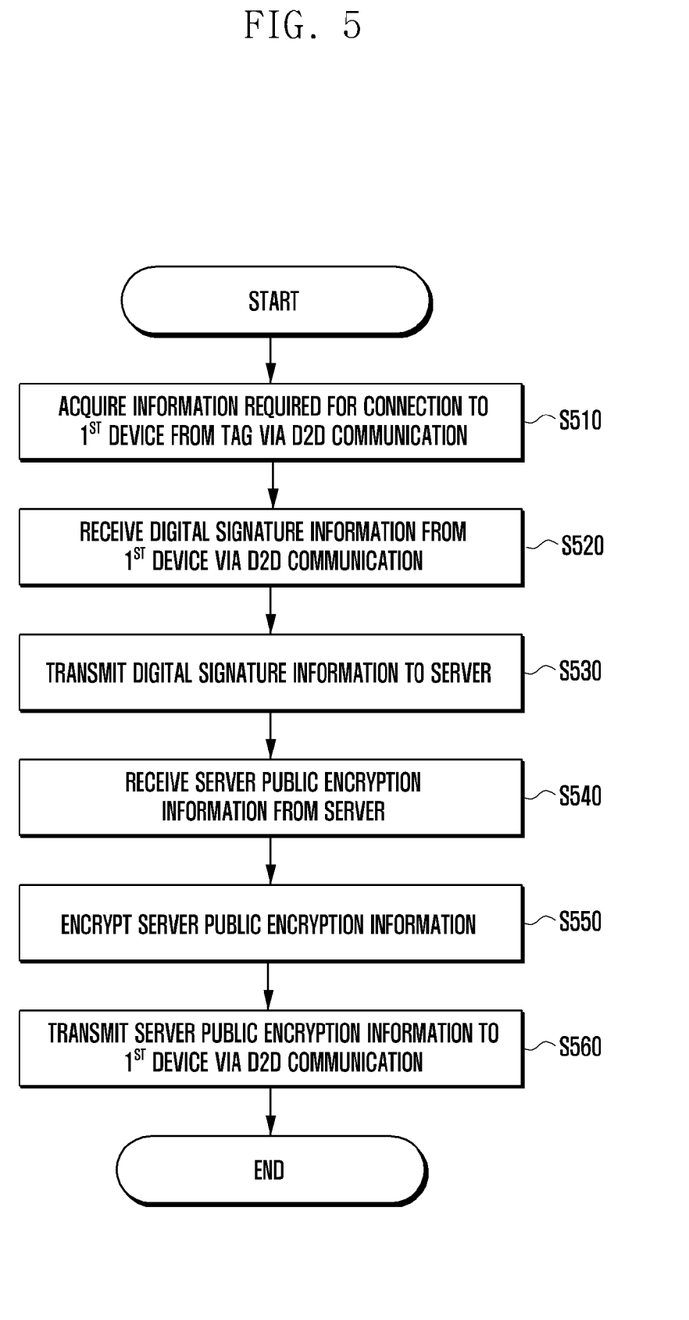
FIG. 5 illustrates a flow chart of a method for registering a 1st D2D communication device in a server by a mobile terminal according to an embodiment of the present disclosure.

FIG. 5 illustrates a flow chart of a method for registering a 1st D2D communication device in a server by a mobile terminal according to an embodiment of the present disclosure.

Referring to FIG. 5, the mobile terminal acquires information required to be connected to the 1st device from a tag of the 1st device via D2D communication at operation S510. The information required to be connected to the 1st device may include public encryption information of the 1st device. The tag of the 1st device may include at least one of a QR code, an NFC tag, a RFID tag, a barcode, etc.

The mobile terminal is connected to the 1st device using the acquired information. The mobile terminal receives digital signature information from the 1st device via D2D communication at operation S520, and transmits the digital signature information to the server at operation S530.

The server authenticates the digital signature information of the 1st device and transmits the validation result to the mobile terminal. When the digital signature information is successfully authenticated, the mobile terminal receives the server public encryption information from the server at operation S540. The mobile terminal encrypts the received server public encryption information using the public encryption information of the 1st device at operation S550. The mobile terminal transmits the encrypted server public encryption information to the 1st device via D2D communication at operation S560. In an embodiment of the present disclosure, when transmitting the server public encryption information to the 1st device, the mobile terminal can also transmit information required to connect to the 2nd device. The information required to connect to the 2nd device may include at least one of a SSID of the 2nd device, a password, and a Secure Option.

Figure 6:
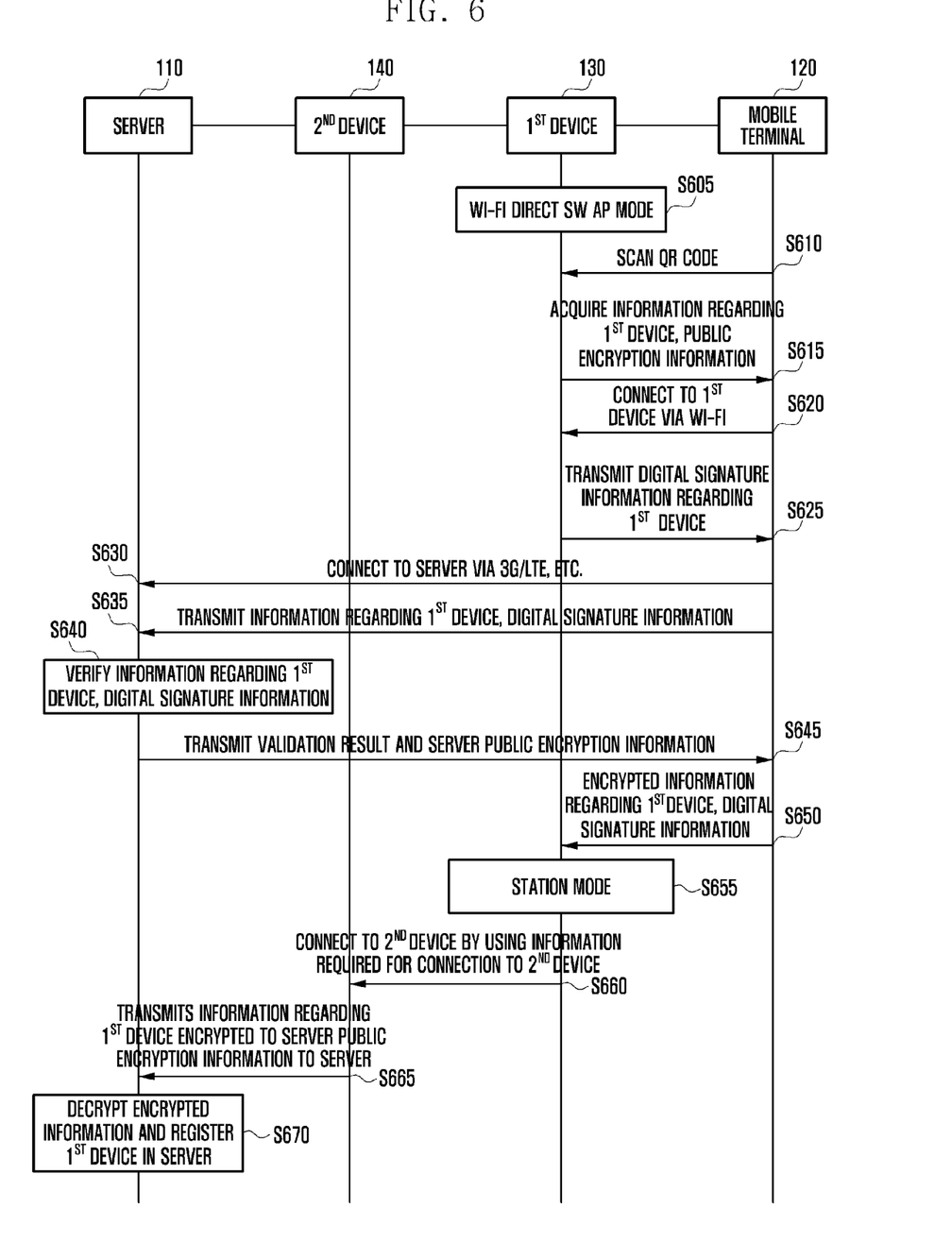
FIG. 6 illustrates a flow diagram of a method for registering a 1st D2D communication device in a server according to an embodiment of the present disclosure.

FIG. 6 illustrates a flow diagram of a method for registering a 1st device capable of D2D communication device (a 1st D2D communication device) in a server according to an embodiment of the present disclosure.

Referring to FIG. 6, when a 1st D2D communication device 130 receives an input by a user pressing the registration button, the 1st D2D device 130 performs a mode switching operation and operates in Wi-Fi Direct AP mode at operation S605. The user can read information included in the tag of the 1st device via the mobile terminal. The camera unit of the mobile terminal can scan a QR code attached to the 1st device at operation S610. Reading information from a tag may include reading an NFC tag attached to the 1st device via the communication unit of the mobile terminal. The 1st device 130 acquires information from the NFC tag of the 1st device, which includes device information of the 1st device and public encryption information of the 1st device, at operation S615. The device information of the 1st device includes a MAC Address of the 1st device. The public encryption information of the 1st device includes a public key of the 1st device. The information acquired from the tag may further include information required for D2D communication with the 1st device (e.g., a SSID, a password, and a Secure Option, etc.), a URI of a server, and CA signature. In an embodiment of the present disclosure, the authentication procedure for the 1st device can be triggered by pressing the registration button and scanning the QR code.

When the authentication procedure for the 1st device is triggered, the mobile terminal is connected to the 1st device using the information acquired from the tag of the 1st device. The mobile terminal is connected to the 1st device, via Wi-Fi, by using the acquired from the tag at operation S620. The 1st device encrypts the digital signature information of the 1st device by the private key of the 1st device and transmits the encrypted digital signature information to the mobile terminal via Wi-Fi at operation S625. The digital signature information may include a device signature.

When receiving the digital signature information of the 1st device, the mobile terminal is connected to the server via a mobile communication network (e.g., 3rd Generation Partnership Project (3GPP), Long Term Evolution (LTE), etc.) at operation S630. In that case, the mobile terminal and server can be connected to each other via a secure channel. The mobile terminal transmits the device information of the 1st device and the digital signature information of the 1st device to the server at operation S635. The digital signature information of the 1st device may include CA signature and Device Signature. After receiving the device information of the 1st device and the digital signature information of the 1st device, the server authenticates the received information at operation S640. The server transmits the validation result to the mobile terminal. When the digital signature information of the 1st device is authenticated, the server transmits the server public encryption information and the validation result to the mobile terminal at operation S645. The server public encryption information may include a public key of the server. In an embodiment of the present disclosure, the server transmits a CA Signature, a validation result of the 1st device, and the server public encryption information to the mobile terminal.

After receiving the server public encryption information, the mobile terminal encrypts information required to be connect to the 2nd device and the server public encryption information using public encryption information of the 1st device and transmits the encrypted information to the 1st device at operation S650. The information required to connect to the 2nd device may include a SSID, a password, and a Secure Option. After receiving the encrypted information, the 1st device decrypts the encrypted information using the private encryption information. The private encryption information of the 1st device may include a private key of the 1st device. The mobile terminal also disables D2D communication. The mobile terminal performs a mode switching operation and operates in a station mode at operation S655. After that, the 1st device is connected to the 2nd device using the information required to connect to the 2nd device at operation S660. After connecting to the 2nd device, the 1st device transmits the device information of the 1st device, encrypted by the server public encryption information, to the server via the 2nd device at operation S665. When receiving the encrypted device information of the 1st device, the server decrypts the encrypted device information and registers the 1st device therein at operation S670. After that, the server provides services to the 1st device. For example, if the 1st device is a home appliance, the server can periodically check the states of the home appliance and transmit corresponding commands to the home appliance.

As described above, the present disclosure is implemented in such a way that authentication information of devices that required for D2D communication can be stored in tags. That is, information needed to register the device in a server is stored in tags, and a mobile terminal can read the stored information from the tags, if necessary. This makes device users reduce information input time and increase user convenience. The present disclosure receives public encryption information from the server and the D2D communication devices and performs information transmission/reception by using the public encryption information, thereby increasing security.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for registering a 1st device-to-device (D2D) communication device in a server, the method comprising:
   transmitting, by the 1st D2D communication device, digital signature information of the 1st D2D communication device to a mobile terminal via D2D communication;
   receiving, by the 1st D2D communication device, when the digital signature information is successfully authenticated in the server, server public encryption information, from the mobile terminal via D2D communication; and
   transmitting, by the 1st D2D communication device, device information of the 1st D2D communication device, which is encrypted using the server public encryption information, to the server, and registering the 1st D2D communication device in the server.

2. The method of claim 1, further comprising:
   activating D2D communication when sensing a user's input.

3. The method of claim 2, wherein the D2D communication comprises Wi-Fi Direct.

4. The method of claim 1, further comprising:
   acquiring, by the mobile terminal, information required to connect to the 1st D2D communication device via D2D communication, from a tag attached to the 1st D2D communication device.

5. The method of claim 4, wherein the tag comprises:
   at least one of a Quick Response (QR) code, a Near Field Communication (NFC) tag, a Radio Frequency Identification (RFID) tag, and a barcode.

6. The method of claim 1, wherein the transmission of the device information encrypted and the registration of the 1st D2D communication device comprises:
   deactivating D2D communication;
   connecting to a 2nd device; and
   transmitting the encrypted device information of the 1st D2D communication device to the server via the 2nd device.

7. A 1st device-to-device (D2D) communication device, the 1st D2D communication device comprising:
   a communication unit for communicating with a mobile terminal via D2D communication; and
   a controller configured to control the communication unit to transmit digital signature information of the 1st D2D communication device to the mobile terminal, to receive, when the digital signature information is successfully authenticated in a server, server public encryption information from the mobile terminal, and to transmit device information of the 1st D2D communication device, which is encrypted using the server public encryption information, to the server, and register the 1st D2D communication device in the server.

8. The 1st D2D communication device of claim 7, further comprising:
   an input unit for sensing a user's input,
   wherein the controller activates D2D communication when sensing a user's input via the input unit.

9. The 1st D2D communication device of claim 7, further comprising:
   a tag attached to the 1st D2D communication device,
   wherein the tag comprises information that the mobile terminal needs to connect to the 1st D2D communication device via D2D communication.

10. The 1st D2D communication device of claim 9, wherein the tag comprises:
    at least one of a Quick Response (QR) code, a Near Field Communication (NFC) tag, a Radio Frequency Identification (RFID) tag, and a barcode.

11. A method for registering a 1st device-to-device (D2D) communication device in a server via a mobile terminal, the method comprising:
    receiving, by the mobile terminal, digital signature information of the 1st D2D communication device from the 1st D2D communication device via D2D communication;
    transmitting, by the mobile terminal, the digital signature information to the server;
    receiving, by the mobile terminal, when the digital signature information is successfully authenticated in the server, server public encryption information from the server; and
    transmitting, by the mobile terminal, the server public encryption information to the 1st D2D communication device via D2D communication.

12. The method of claim 11, further comprising:
acquiring, by the mobile terminal, information required to connect to the 1st D2D communication device via D2D communication from a tag attached to the 1st D2D communication device.

13. The method of claim 12, wherein the tag comprises:
at least one of a Quick Response (QR) code, a Near Field Communication (NFC) tag, a Radio Frequency Identification (RFID) tag, and a barcode.

14. The method of claim 12, wherein the transmission of the server public encryption information comprises:
transmitting information required to connect to a 2nd device, which can communicate with the server and the 1st D2D communication device respectively, to the 1st D2D communication device.

15. The method of claim 12, further comprising encrypting the server public encryption information using the public encryption information of the 1st D2D communication device,
wherein the information required to connect to the 1st D2D communication device via D2D communication comprises public encryption information of the 1st D2D communication device.

16. A mobile terminal comprising:
a communication unit configured to communicate with a 1st device or a server; and
a controller configured to control the communication unit to receive digital signature information of the 1st device via device-to-device (D2D) communication, to transmit the digital signature information to the server, to receive, when the digital signature information is successfully authenticated in the server, server public encryption information from the server, and to transmit the server public encryption information to the 1st device via D2D communication.

17. The mobile terminal of claim 16, further comprising:
a camera unit configured to acquire information, which is required to connect to the 1st device via D2D communication, from a tag attached to the 1st device.

18. The mobile terminal of claim 17, wherein the tag comprises:
at least one of a Quick Response (QR) code, a Near Field Communication (NFC) tag, a Radio Frequency Identification (RFID) tag, and a barcode.

19. The mobile terminal of claim 16, wherein the controller controls the communication unit to transmit information which is required to connect to a 2nd device that can communicate with the server and the 1st device respectively, to the 1st device when transmitting the server public encryption information to the 1st device.

20. The mobile terminal of claim 17, wherein:
the information required to connect to the 1st device via D2D communication comprises public encryption information of the 1st device; and
the controller encrypts the server public encryption information using the public encryption information of the 1st device before transmitting the server public encryption information to the 1st device.

* * * * *